United States Patent [19]

Kumura et al.

[11] Patent Number: 4,736,655

[45] Date of Patent: Apr. 12, 1988

[54] APPARATUS FOR CONTROLLING REDUCTION RATIO IN CONTINUOUSLY VARIABLE TRANSMISSION

[75] Inventors: Haruyoshi Kumura, Yokohama; Sigeaki Yamamuro, Zushi; Hiroyuki Hirano; Keiju Abo, both of Yokohama; Masaki Nakano, Kawasaki, all of Japan

[73] Assignee: Nissan Motor Co., Ltd., Yokohama City, Japan

[21] Appl. No.: 874,466

[22] Filed: Jun. 16, 1986

[30] Foreign Application Priority Data

Jun. 17, 1985 [JP] Japan ................................. 60-129868

[51] Int. Cl.⁴ ........................ B60K 41/12; B60K 41/18
[52] U.S. Cl. .................................... 74/866; 364/424.1
[58] Field of Search ........................ 74/861, 862, 866; 364/424.1

[56] References Cited

U.S. PATENT DOCUMENTS

| | | | |
|---|---|---|---|
| 4,507,986 | 4/1985 | Okamura et al. | 74/866 |
| 4,526,557 | 7/1985 | Tanaka et al. | 74/861 X |
| 4,542,665 | 9/1985 | Yamamuro et al. | 74/866 |
| 4,561,327 | 12/1985 | Niwa et al. | 74/866 |
| 4,566,354 | 1/1986 | Kumura et al. | 74/866 |
| 4,576,265 | 3/1986 | Kumura et al. | 192/0.055 |
| 4,579,021 | 4/1986 | Yamamuro et al. | 74/865 X |
| 4,589,071 | 5/1986 | Yamamuro et al. | 74/866 X |
| 4,590,561 | 5/1986 | Abo et al. | 74/866 X |
| 4,597,308 | 7/1986 | Tanaka et al. | 74/866 |
| 4,622,867 | 11/1986 | Nishioka et al. | 74/866 |

FOREIGN PATENT DOCUMENTS

58-180867 10/1983 Japan .

*Primary Examiner*—Dirk Wright
*Attorney, Agent, or Firm*—Schwartz, Jeffery, Schwaab, Mack, Blumenthal & Evans

[57] ABSTRACT

The invention provides an apparatus wherein a parameter indicative of the actual position of a shift actuator is reset periodically when the transmission shift to the largest reduction ratio by such operation is prevented when the vehicle speed is greater than a predetermined vehicle speed value, such as 10 km/h.

3 Claims, 10 Drawing Sheets

TO STEP 501 OF FIG. 5

APPARATUS FOR CONTROLLING REDUCTION RATIO IN CONTINUOUSLY VARIABLE TRANSMISSION

BACKGROUND OF THE INVENTION

The present invention relates to an apparatus for controlling a reduction ratio in a continuously variable transmission.

U.S. patent application Ser. No. 486,448 filed Apr. 19, 1983, now U.S. Pat. No. 4,597,308, discloses an apparatus for controlling a reduction ratio of a continuously variable transmission. According to this known apparatus, a shift reference switch is turned on when the continuously variable transmission has attained the largest reduction ratio, a shift actuator in the form of a stepper motor is actuated in an open loop manner to achieve a desired reduction ratio, a parameter (this parameter being called a "pulse number NA" in this U.S. patent) is stored which is indicative of the position of the shift actuator, and, the parameter is reset to a predetermined value whenever the shift reference switch is turned on. This known apparatus does not require the detection of an actual reduction ratio or an actual shift actuator operating position because of the shift reference switch. Since according to this known apparatus the shift actuator is caused to move to a predetermined position which causes the continuously variable transmission to attain the largest reduction ratio whenever the ignition switch is turned on or a computer of the apparatus is reset, the shift actuator will move toward the predetermined position to shift the transmission toward the largest reduction ratio if the ignition switch is turned on after having been turned off unintentionally during running of the motor vehicle or the computer is reset during running of the motor vehicle owing to generation of noise. If the shift motor should move to the predetermined position during running of the vehicle, the transmission shifts toward the largest reduction ratio, subjecting the vehicle to rapid engine braking to the extent that the engine may overrun.

An object of the present invention is to improve an apparatus for controlling a continuously variable transmission of the above mentioned type such that the above mentioned problem will not arise even if an ignition switch is turned on after the ignition switch has been turned off unintentionally during running of the motor vehicle or the computer of the apparatus has been reset during running of the motor vehicle.

SUMMARY OF THE INVENTION

According to the present invention, there is provided an apparatus for controlling a reduction ratio of a continuously variable transmission of a motor vehicle. The continuously variable transmission includes a shift actuator and is shiftable by the shift actuator. The apparatus comprises:

means for generating a reference signal when the shift actuator of the continuously variable transmission attains a predetermined position;

means for generating a desired signal indicative of a desired position of the shift actuator;

means for comparing a parameter with said desired signal;

means for varying said parameter toward said desired signal in response to a result of comparison by said comparing means;

means for causing the shift actuator to vary the position thereof in response to a variation in said parameter;

means for setting said parameter to a predetermined state in response to said reference signal;

means for detecting a vehicle speed of the motor vehicle and generating a vehicle speed indicative signal;

means for forcing the shift actuator to move to said predetermined position when said vehicle speed indicative signal is lower than a predetermined vehicle speed value.

Another aspect of the present invention provides a method comprising the steps of:

generating a reference signal when the shift actuator of the continuously variable transmission attains a predetermined position;

generating a desired signal indicative of a desired position of the shift actuator;

comparing a parameter with said desired signal;

varying said parameter toward said desired signal in response to a result of comparison by said comparing step;

causing the shift actuator to vary the position thereof in response to a variation in said parameter;

setting said parameter to a predederminded state in response to said reference signal;

detecting a vehicle speed of the motor vehicle and generating a vehicle speed indicative signal;

forcing the shift actuator to move to said predetermined position when said vehicle speed indicative signal is lower than a predetermined vehicle speed value.

BRIEF DESCRIPTION OF THE DRAWINGS

FIGS. 7A and 7B, when combined, illustrate a flow chart of a stepper motor controlling routine 700.

DETAILED DESCRIPTION OF THE INVENTION

Figure 1:
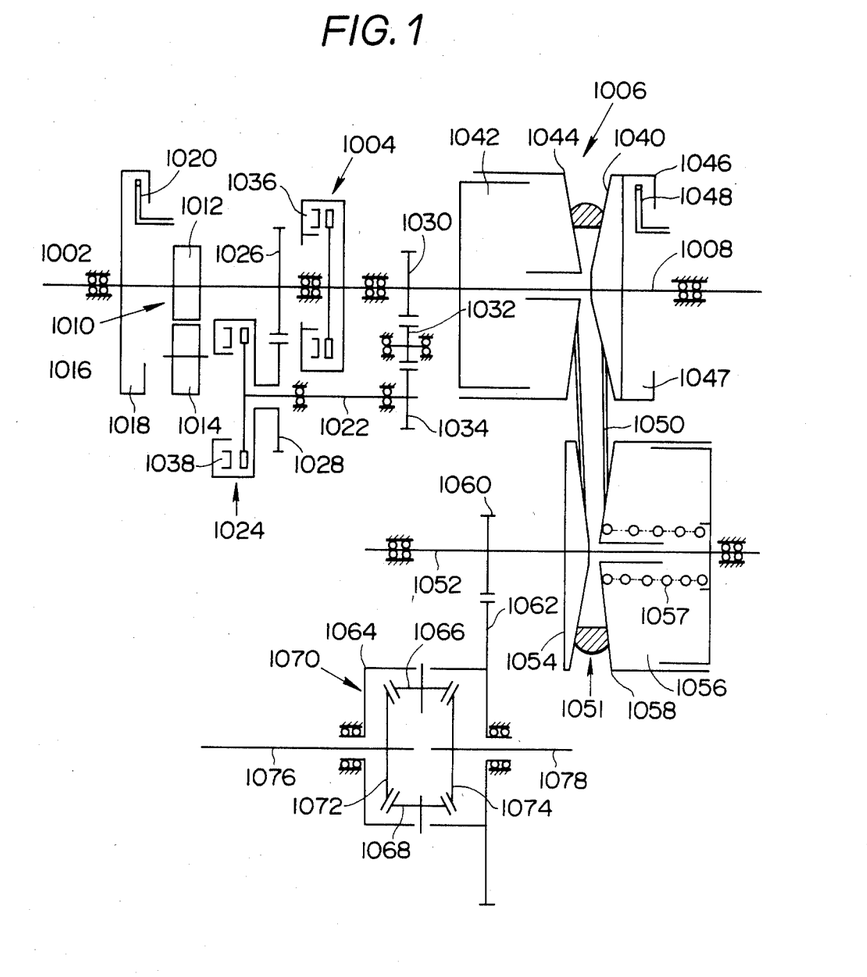
FIG. 1 is a diagrammatic view of a transmission mechanism of a continuously variable V-belt transmission.
Figure 2A:
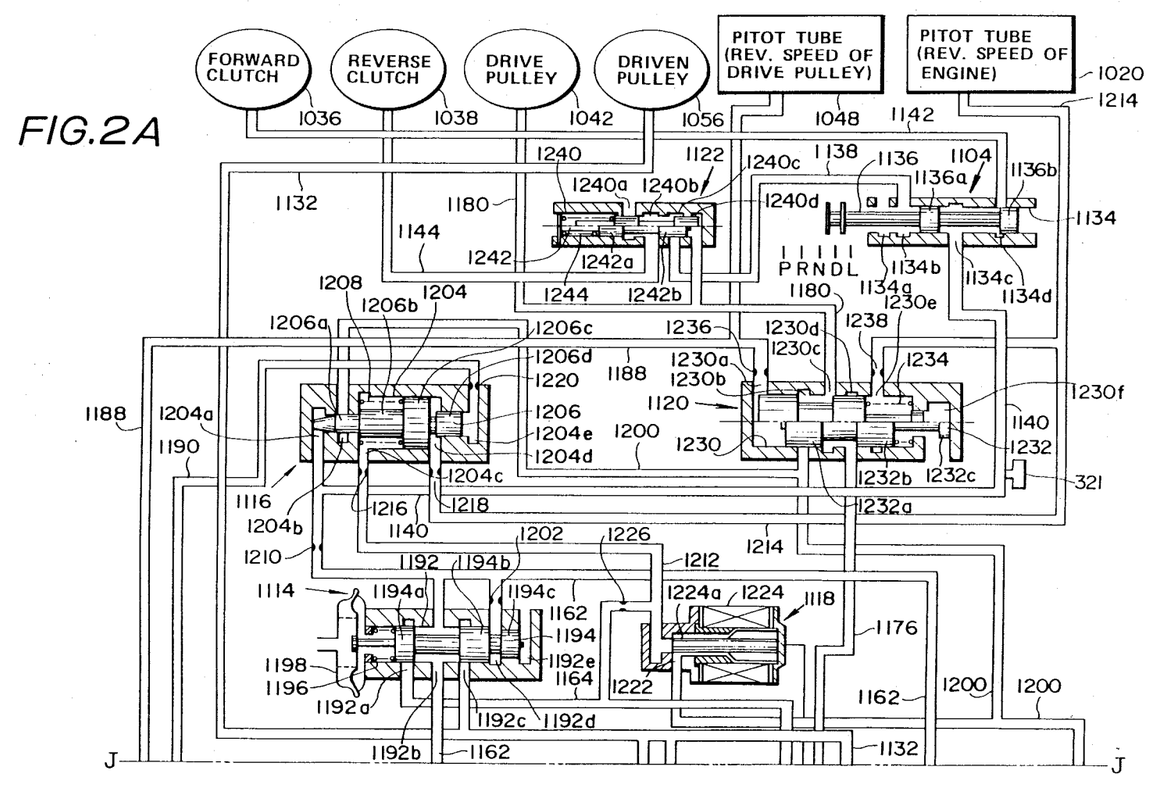
FIG. 2A and 2B, when combined, illustrate a hydraulic control system including a shift actuator in the form of a stepper motor.
Figure 2B:
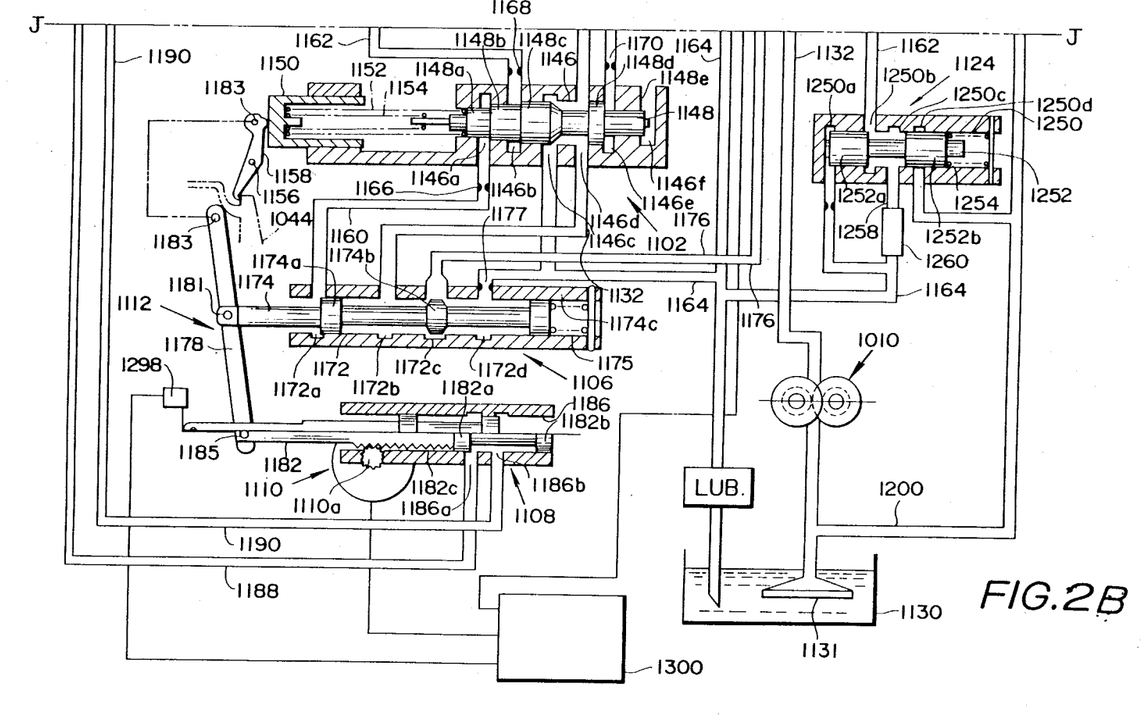
Figure 3:
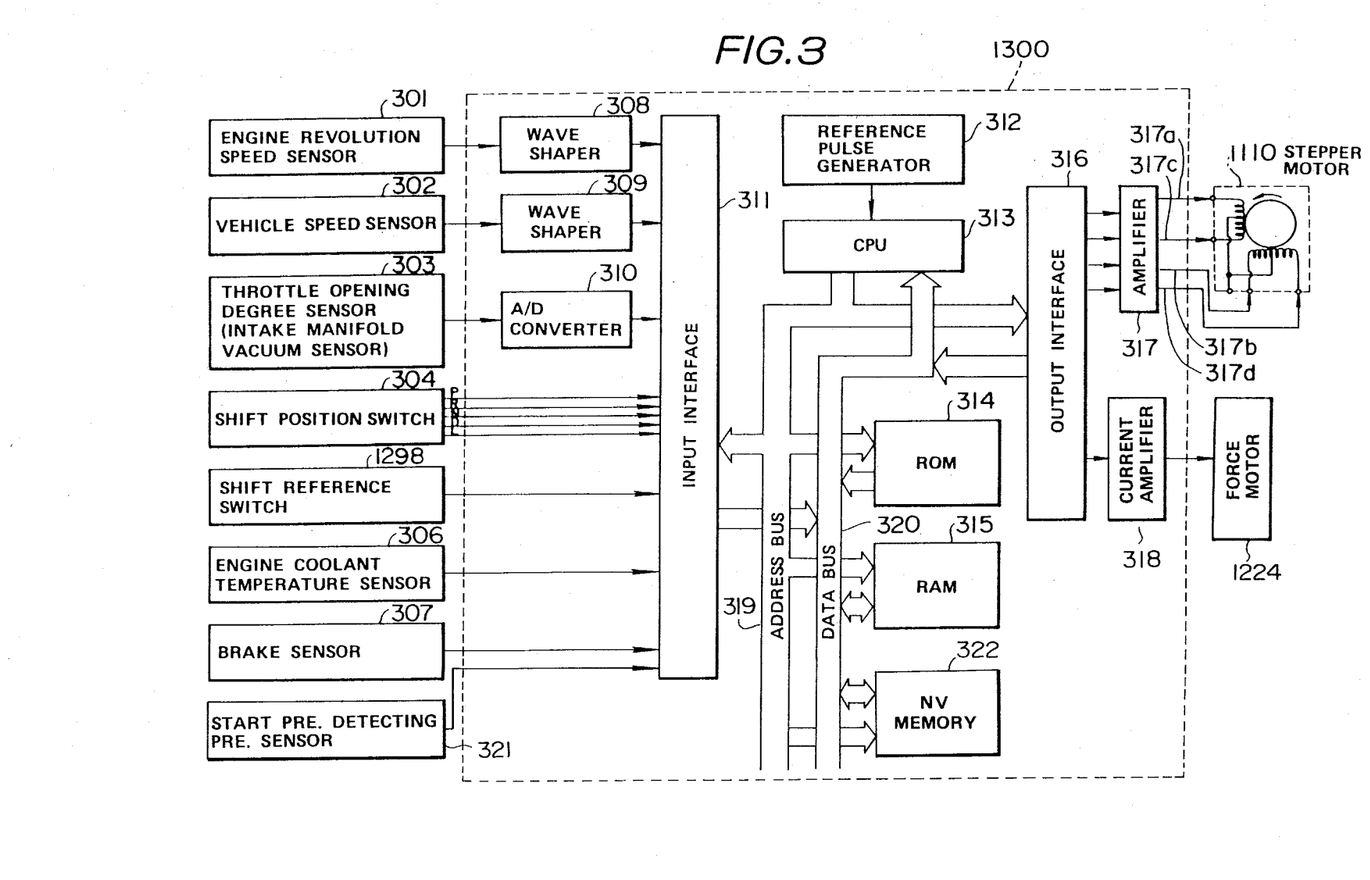
FIG. 3 is a block diagram showing an electronic control unit 1300 for controlling stepper motor 1110 and force motor 1224 shown in FIGS. 2A and 2B.

Referring to FIGS. 1, 2A and 2B, the transmission mechanism and hydraulic control system of the continuously variable transmission are illustrated. To understand the continuously variable transmission, reference is made to U.S. Pat. No. 4,576,265 issued to Kumura et al. on Mar. 18, 1986 which has been incorporated by reference in its entirety. This U.S. patent incorporates in column 3, line 66 to column 4, line 4, U.S. patent application Ser. No. 489,600, now U.S. Pat. No. 4,579,021, which is also incorporated by reference herein. Attention is directed particularly to the description of FIGS. 24, 25A, 25B of U.S. Pat. No. 4,579,021. Referring to FIG. 3, the control unit 1300 shown herein is substantially similar to a control unit shown in FIG. 3 of the already incorporated U.S. Pat. No. 4,576,265 except the addition of a nonvolatile memory (NV MEMORY) 322.

Hereinafter, it is described referring to flow charts shown in FIGS. 4 to 7B how the control unit 1300 controls the stepper motor 1110 and force motor 1224.

Figure 4:
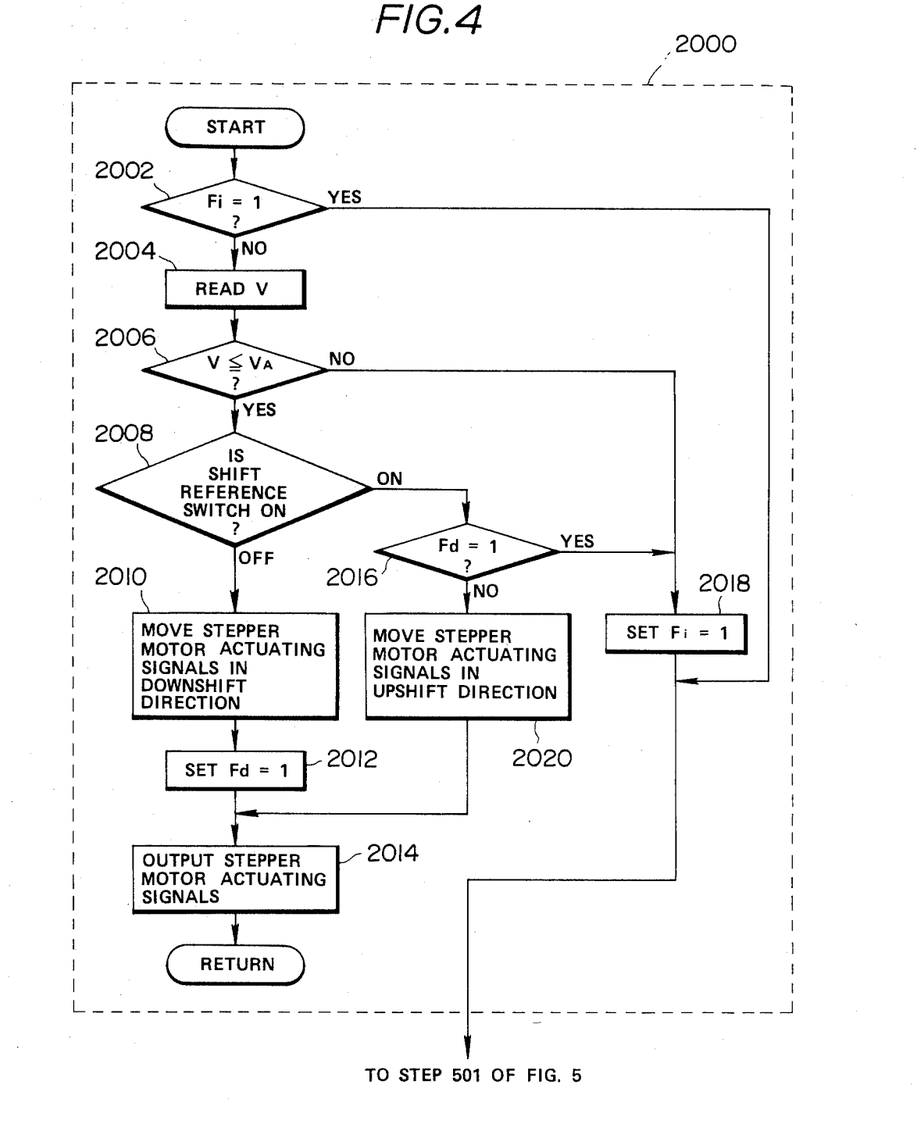
FIG. 4 is a flow chart of an initializing routing 2000.

Execution of the initializing routine 2000 shown in FIG. 4 is effected before execution of the other routines 500, 600 and 700. There is provided an initial flag Fi which is cleared at engine cranking immediately after the ignition switch has been turned on. First of all, the CPU 313 executes step 2002 where it decides whether the initial flag Fi is set ($F_1=1$) or not. If the flag Fi is not set (i.e., Fi=0), the CPU 313 proceeds to step 2004 where it reads vehicle speed V. Then, it proceeds to step 2006 where it decides whether the vehicle speed V is not greater than a predetermined small vehicle speed value $V_A$, for example 10 km/h. If the vehicle speed V is not greater than $V_A$, it proceeds to step 2008 where it decides whether a shift reference switch 1298 (see FIG. 2B) is rendered on. If the shift reference switch 1298 is in the off-state, the CPU 313 proceeds to step 2010 where it causes stepper motor actuating signals to move in downshift a direction. Then, it proceeds to step 2012 where it sets a down flag Fd=1, and to step 2014 where it outputs stepper motor actuating signals. This causes stepper motor 1110 to rotate in such a direction as to establish a larger reduction ratio. If the stepper motor 1110. has moved to a predetermined position where the shift reference switch 1298 turns on, the CPU 313 proceeds from step 2008 to step 2016 where it decides whether the down flag Fd is set (Fd=1?). If the down flag Fd is set, the CPU 313 proceeds to step 2018 where it sets the initial flag Fi=1. After step 2018, the CPU 313 jumps to step 501 or force motor controlling routine 500 shown in FIG. 5.

Figure 5:
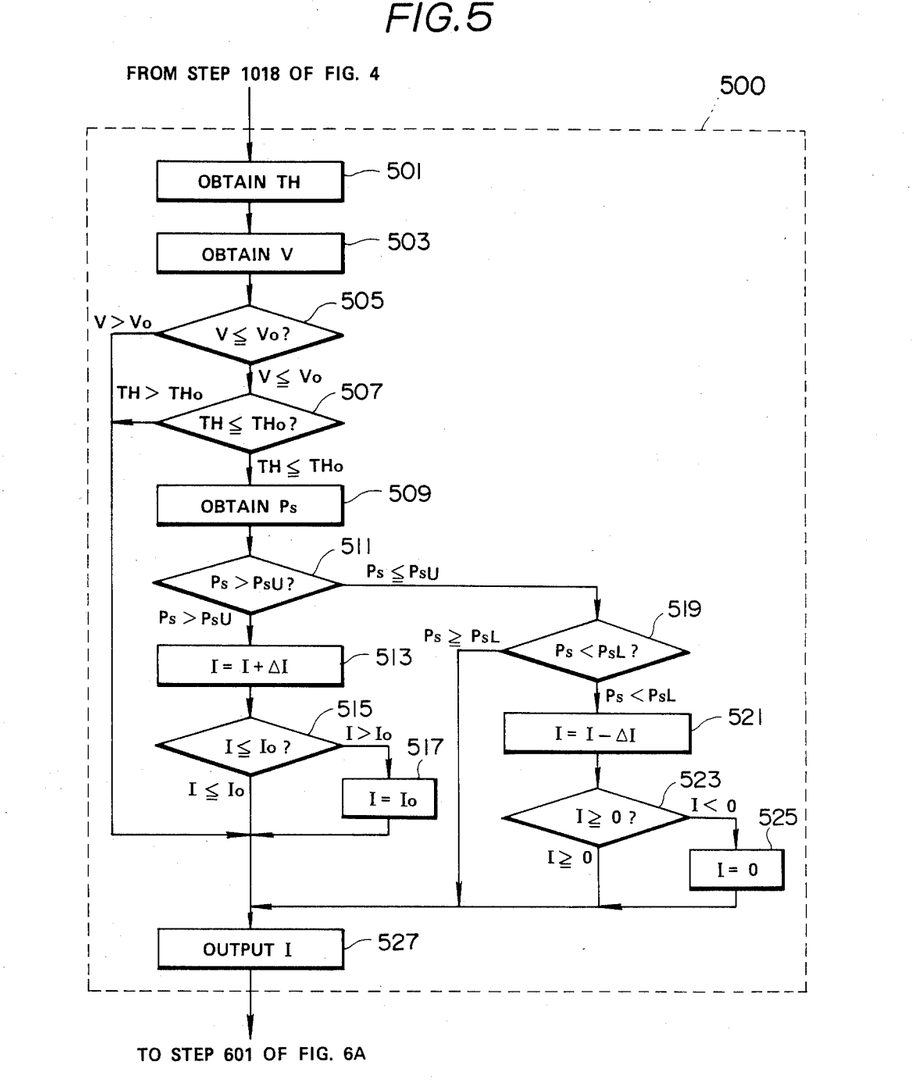
FIG. 5 is a flow chart of a force motor controlling routine 500.

In the case where the shift reference switch 1298 is initially rendered on and the down flag Fd is not set (i.e., Fd=0) when it proceeds from step 2008 to step 2016, the CPU 313 proceeds to step 2020 where it causes stepper motor actuating signals to move in an upshift direction. The execution of step 2020 is repeated until the shift reference switch 1298 is turned on. After the shift reference switch 1298 has been turned on, the CPU 313 sets the down flag FD=1 at step 2012, and thereafter it proceeds to step 2018 after executing steps 2014, 2002, 2004, 2006, 2008 and 2016. Thus, immediately after the stepper motor 1110 has moved to the position where the shift reference switch 1298 is turned on from the previous off-state, the initial flag Fi is set before the CPU 313 proceeds to step 501 of the force motor controlling routine 500.

Once the inital flag Fi is set, the CPU 313 proceeds directly to step 501 after execution of step 2002.

In the state where the initial flag Fi has not been set, if the vehicle speed V is greater than $V_A$ when the CPU 313 proceeds to step 2006, it proceeds to step 2018 where it sets the initial flag Fi and then proceeds to step 501. This means that even if the initial flag Fi should be cleared while the vehicle is running at speed higher than $V_A$, the CPU 313 will not proceed from step 2006 to step 2008 and the following steps shown in FIG. 4. Therefore, the CPU 313 will not cause the shift motor 1110 to rotate for initial adjustment as long as the vehicle travels at a speed higher than $V_A$.

Figure 6A:
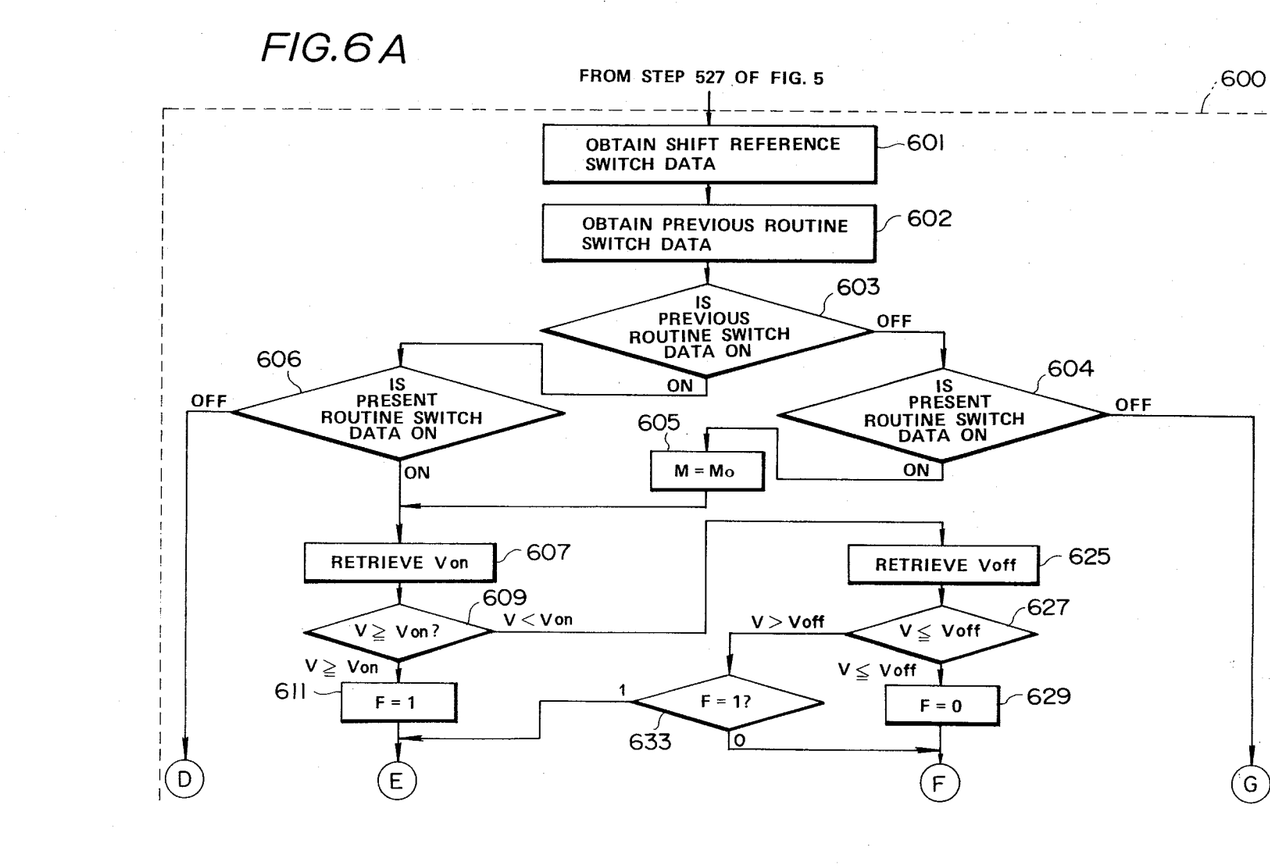
FIGS. 6A and 6B, when combined, illustrate a flow chart of a complete engagement controlling routine 600.
Figure 6B:
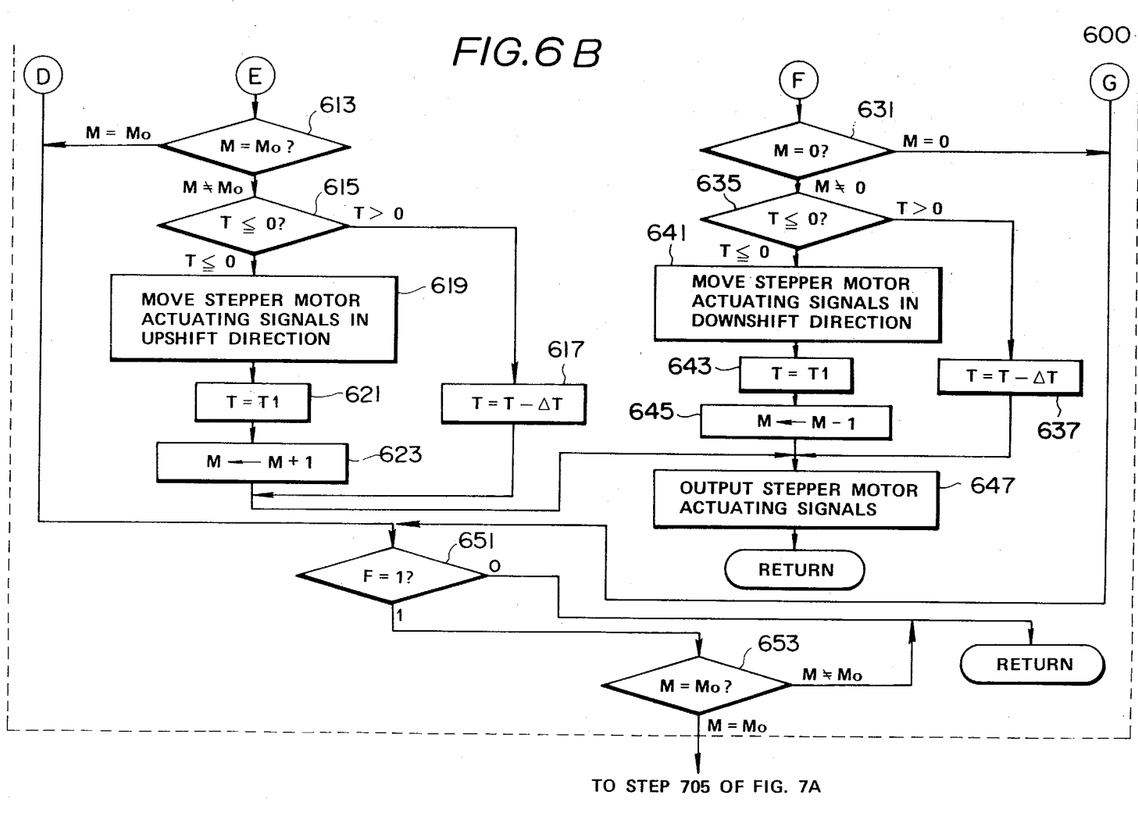

After the execution of the above mentioned initializing routing 2000, the force motor controlling routine 500 and complete engagement controlling routine 600 are executed in this order.

Figure 7A:
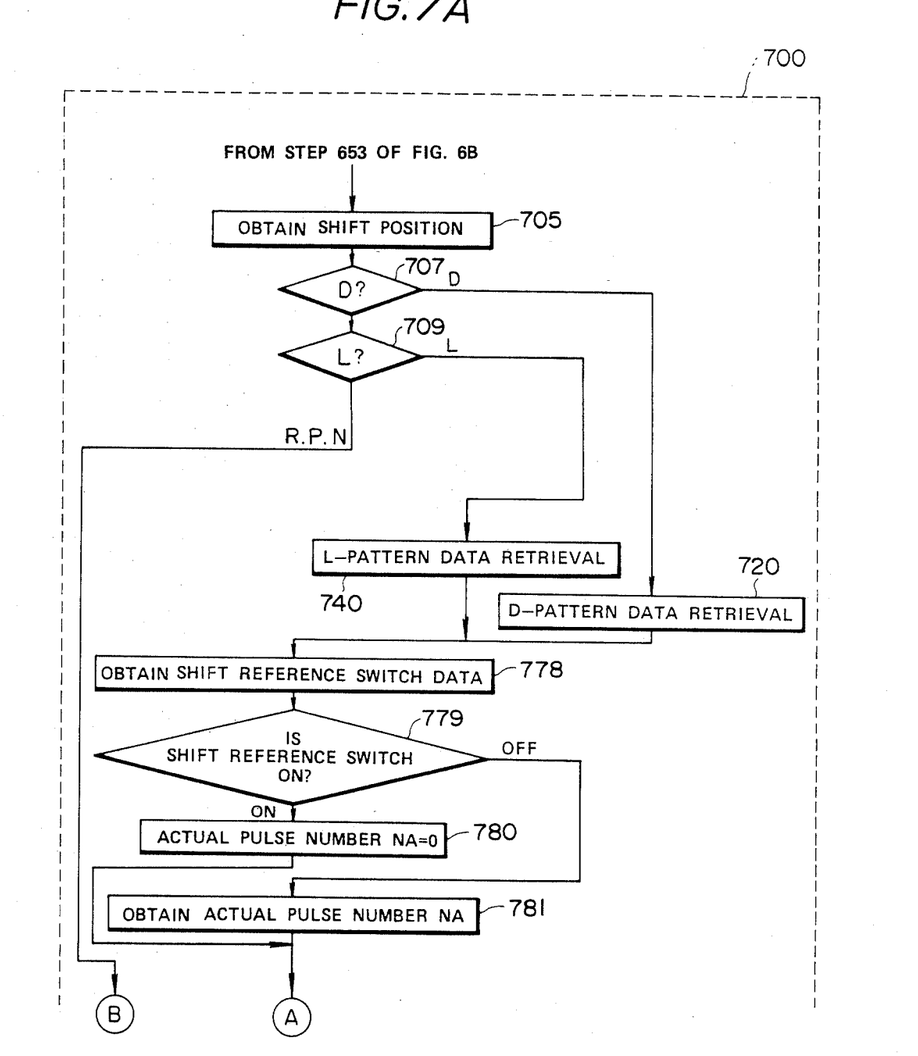

After the execution of the complete engagement controlling routine 600, stepper motor controlling routine 700 is executed. In the before mentioned initializing routine 2000, the CPU 313 is allowed to proceed from step 2008 to step 2016 and then to step 2018 when the shift reference switch 1298 turns on in the present run though it stayed off in the previous run. This corresponds to the situation where the stepper motor 1110 has moved to the predetermined position to cause the reference switch 1298 to turn on. In this case, the CPU proceeds from step 778 to step 779 and then to step 780 where it sets NA=0, or it proceeds from step 713 to step 715 and then to step 717 where it sets NA=0. The pulse number NA corresponds to the position of the stepper motor 1110 and the fact that NA=0 indicates that the stepper motor 1110 assumes the predetermined position where the signal adjustment takes place. Thus, correction of the pulse number which corresponds to the position of the stepper motor 1110 is effected. The stepper motor controlling routine 700 is substantially the same as the counterpart disclosed in U.S. Pat. No. 4,576,265 except that the pulse number NA is stored in the nonvolatile memeory 322. Because the data is stored in the nonvolatile memory, the pulse number NA immediately before diconnection of the electric power can be obtained and thus the position of the stepper motor 1110 can stay unchanged after the electric power source is connected again subsequently.

What is claimed is:

1. An apparatus for controlling a reduction ratio of a continuously variable transmission of a motor vehicle, the continuously variable transmission including a shift actuator for shifting the reduction ratio of said transmission, wherein a desired signal is compared with a parameter, the parameter is varied toward said desired signal in response to a result of the comparison of the desired signal with the parameter, the position of the shift actuator is varied in response to a variation in the parameter, and the parameter is set to a predetermined state when the shift actuator attains a predetermined position, said apparatus comprising:

means for detecting vehicle speed of the motor vehicle and generating a vehicle speed indicative signal;
  means for forcing the shift actuator to move to said predetermined position when said vehicle speed indicative signal is lower than a predetermined vehicle speed value after a predetermined condition has been established and for preventing the shift actuator from moving to said predetermined position when said vehicle speed indicative signal is higher than said predetermined value even if said predetermined condition has been established.

2. A method of controlling a reduction ratio of a continuously variable transmission of a motor vehicle, the continuously variable transmission including a shift actuator for shifting the reduction ratio of said transmission, wherein a desired signal is compared with a parameter, the parameter is varied toward said desired signal in response to a result of the comparison of the desired signal with the parameter, the position of the shift actuator is varied in response to a variation in the parameter, and the parameter is set to a predetermined state when the shift actuator attains a predetermined position, said method comprising:

detecting vehicle speed of the motor vehicle and generating a vehicle speed indicative signal;
  executing a routine wherein the shift actuator is forced to move to said predetermined position when said vehicle speed indicative signal is lower than a predetermined vehicle speed value after a predetermined condition has been established; and bypassing said routine when said vehicle speed indicative signal is higher than said predetermined value even if said predetermined condition has been established.

3. In an apparatus for controlling a reduction ratio of a continuously variable transmission of a motor vehicle, the continuously variable transmission including a shift actuator for shifting the reduction ratio of said transmission, wherein a desired signal is compared with a parameter, the parameter is varied toward said desired signal in response to a result of the comparison of the desired signal with the parameter, the position of the shift actuator is varied in response to a variation in the parameter, and the parameter is set to a predetermined state when the shift actuator attains a predetermined position, said apparatus comprising:

means for detecting vehicle speed of the motor vehicle and generating a vehicle speed indicative signal;

nonvolatile memory means for storing the parameter after the control apparatus has been disconnected from a source of electric power;

means for forcing the shift actuator to move to said predetermined position when said vehicle speed indicative signal is lower than a predetermined vehicle speed value after a predetermined condition has been established and for preventing the shift actuator from moving to said predetermined position by using the parameter stored in the nonvolatile memory means when said vehicle speed indicative signal is higher than said predetermined value even if said predetermined condition has been established.

* * * * *